United States Patent [19]
LeNoue et al.

[11] Patent Number: 5,328,123
[45] Date of Patent: Jul. 12, 1994

[54] SINGLE REEL CARTRIDGE WITH DECREASED BASE SINK

[75] Inventors: Curtis G. LeNoue; Navnit C. Patel; Saurin J. Shah; Steven J. Fischer, all of Wahpeton, N. Dak.; Steven E. Krabbenhoft, Breckenridge, Minn.

[73] Assignee: Minnesota Mining and Manufacturing Company, St. Paul, Minn.

[21] Appl. No.: 993,966

[22] Filed: Dec. 17, 1992

Related U.S. Application Data

[63] Continuation of Ser. No. 756,069, Sep. 6, 1991, abandoned.

[51] Int. Cl.$^5$ ............................................. G11B 33/00
[52] U.S. Cl. .................................. 242/348.3; 206/389; 220/645; 220/DIG. 12
[58] Field of Search ............... 242/195, 197, 199; 360/132; 264/328.12; 220/643, 645, 651, 652, DIG. 12, DIG. 14; 206/387, 389

[56] References Cited

U.S. PATENT DOCUMENTS

| | | | |
|---|---|---|---|
| 4,383,660 | 5/1983 | Richard et al. | 242/197 |
| 4,426,047 | 1/1984 | Richard et al. | 242/197 |
| 4,438,860 | 3/1984 | Okamura et al. | 242/197 |
| 4,452,406 | 6/1984 | Richard | 242/195 |
| 4,706,149 | 11/1987 | Machida et al. | 242/199 |
| 4,775,115 | 10/1988 | Gelardi | 242/195 |
| 4,834,315 | 5/1989 | Watanabe et al. | 242/199 |

*Primary Examiner*—Daniel P. Stodola
*Assistant Examiner*—John Q. Nguyen
*Attorney, Agent, or Firm*—Gary L. Griswold; Walter N. Kirn; Charles D. Levine

[57] ABSTRACT

A single reel data tape cartridge includes a base and a cover. The base includes a rear wall, two opposing side walls, a front wall, and a lower wall connecting the rear, front, and side walls. The lower wall has an outer surface and an inner surface. A strengthening rib is formed on the inner surface of the lower wall adjacent each of the four corners of the base. The portion of the lower wall on one side of and adjacent the strengthening rib has a groove extending along the length of the strengthening rib. The groove and the adjacent strengthening rib share a common wall.

13 Claims, 2 Drawing Sheets

SINGLE REEL CARTRIDGE WITH DECREASED BASE SINK

This is a continuation of Application No. 07/756,069 filed Sep. 6, 1991, now abandoned.

TECHNICAL FIELD

The present invention relates to tape cartridge covers. More particularly, the present invention relates to tape cartridge housings for use in single reel cartridges.

BACKGROUND OF THE INVENTION

Single reel data tape cartridges, known as 3480 type cartridges, include a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the takeup reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The cartridge is formed of a base and a cover. The base includes a rear wall, two opposing side walls, a front wall, and a major, lower wall connecting the rear, front, and side walls. The cover includes a rear wall, two opposing side walls, a front wall, and a major, upper wall connecting the rear, front, and side walls. The upper wall has an upper surface and a lower surface. The upper surface has a substantially rectangular recessed portion which is adapted to receive an identifying label and to receive ribs external to the base of an adjacent cartridge when a plurality of cartridges are stacked one on top of the other. The thickness of the upper wall is substantially constant, generally being 0.20 cm (0.08 in) thick except for the area of the 0.05 cm (0.02 in) deep recess.

Strengthening ribs are formed on the inner surfaces of the cover and the base. However, during the molding of the base, sink occurs in the base on its outer surface. This yields an undesirable unsightly visible mark on the outside of the base corresponding to the shape of the strengthening ribs. This mark is more visible in opaque bases than in translucent bases. The existence of sink impairs the salability of the finished product. The sink is caused by excess shrinkage at the thicker interface between the strengthening ribs and the surface of the cover and base.

There is a need to provide cartridge housing components that do not have aesthetically undesirable sink marks. No known cartridges formed by molding are free from sink problems.

SUMMARY OF THE INVENTION

A single reel data tape cartridge according to the present invention includes a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The cartridge is formed of a base and a cover which combine to form a housing. The base includes a rear wall, two opposing side walls, a front wall, and a lower wall connecting the rear, front, and side walls. The cover includes a rear wall, two opposing side walls, a front wall, and a substantially rectangular upper wall connecting the rear, front, and side walls. The upper wall has an upper surface and a lower surface and the base has an upper surface and a lower surface. A leader block area is formed in one of the corners of the housing.

A strengthening rib is formed on the upper surface of the lower wall adjacent each of the four corners of the base. The portion of the lower wall on one side of and adjacent the strengthening rib has a groove extending along at least part of the length of the strengthening rib, and preferably along substantially the entire length of the strengthening rib. The groove and the strengthening rib share a common wall. The groove extends into the lower wall for at least 30% of the thickness of the major wall.

DETAILED DESCRIPTION OF PREFERRED EMBODIMENTS

Figure 1:
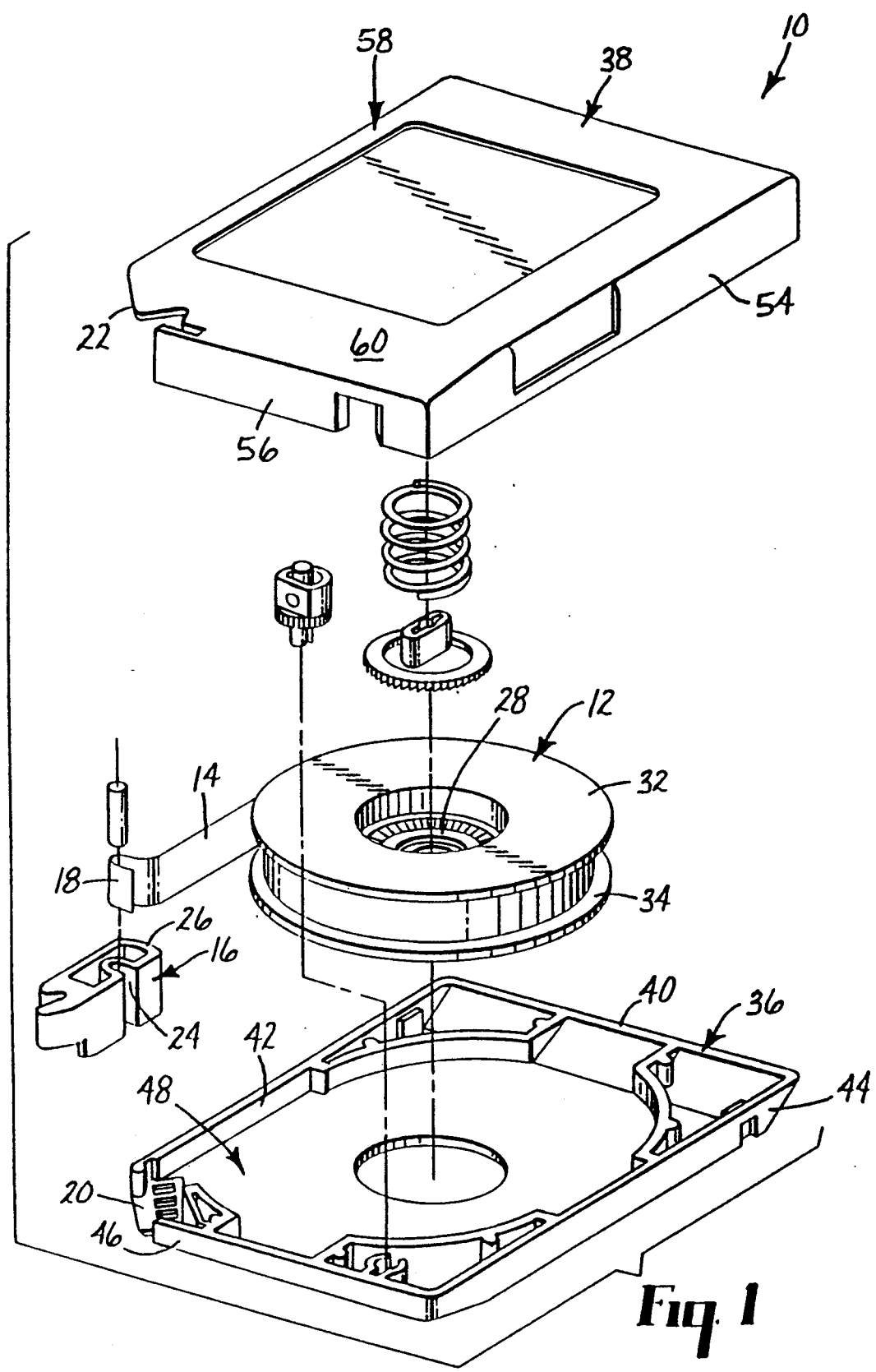
FIG. 1 is a perspective view of a single reel tape cartridge having a cover of the present invention.

A single reel data tape cartridge 10, such as a 3480 type tape cartridge shown in FIG. 1, includes a tape reel 12 containing a plurality of layers of magnetic tape 14 with a leader block 16 attached to the free end 18 of the tape 14 as it extends from the reel 12. The tape reel 12 includes a cylindrical hub having a cylindrical tape winding surface, an upper flange mounted on one axial end of the hub, and a lower flange mounted on the other axial end of the hub. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus and engages an inclined surface of the corner of the cartridge. The rear surface is rounded 26 to form a portion of an arc of a radius to match the periphery of the takeup reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel.

The tape reel 12 includes a cylindrical hub 28 having a cylindrical tape winding surface, an upper flange 32 mounted on one axial end of the hub, and a lower flange 34 mounted on the other axial end of the hub.

The cartridge 10 is formed of a base 36 and a cover 38 which combine to form a housing. The base 36 includes a rear wall 40, two opposing side walls 42, 44, a front wall 46, and a lower wall 48 connecting the rear, front, and side walls. The cover 38 includes a rear wall 50, two opposing side walls 52, 54, a front wall 56, and an upper wall 58 connecting the rear, front, and side walls. The lower wall 48 of the base 36 and the upper wall 58 of the cover 38 are the major walls of the housing.

Figure 3:
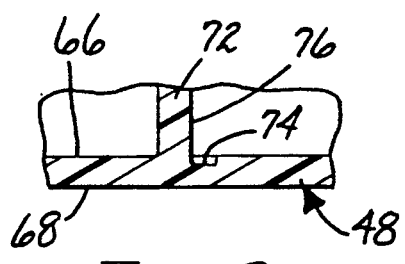
FIG. 3 is a cross-sectional view of the base taken along line 3—3 of FIG. 2.

The upper wall 58 of the cover 38 has an upper, outer surface 60 and a lower, inner surface 62, as shown in FIG. 3. The outer surface 60 has a substantially rectangular recessed portion 64 which is adapted to receive an identifying label and to receive ribs on the base of an adjacent cartridge when a plurality of cartridges are stacked one on top of the other. The lower wall 48 of the base 36 has an upper, inner surface 66 and a lower outer surface 68, as shown in FIG. 3.

A strengthening rib 72 is formed on the inner surface 62 of the upper wall 58 adjacent each of the four corners of the cover 38. A strengthening rib 72 also is formed on the inner surface 66 of the lower wall 48 adjacent each of the four corners of the base 36. The strengthening ribs 72 provide additional support to the tape cartridge 10.

Sink is prevented from appearing in the base 36 on its outer surface 68 during the molding of the base by a groove 74 adjacent the strengthening ribs 72. This minimizes any undesirable marred appearance on the outside of the base 38 and increases the dimensional stability of the cartridge 10. The sink is eliminated by local reduction of the thickness of the lower wall 48 to compensate for the excess plastic material required to form the strengthening ribs 72, without otherwise detracting from the other properties and characteristics of the base 38 and the cartridge as a whole.

Figure 2:
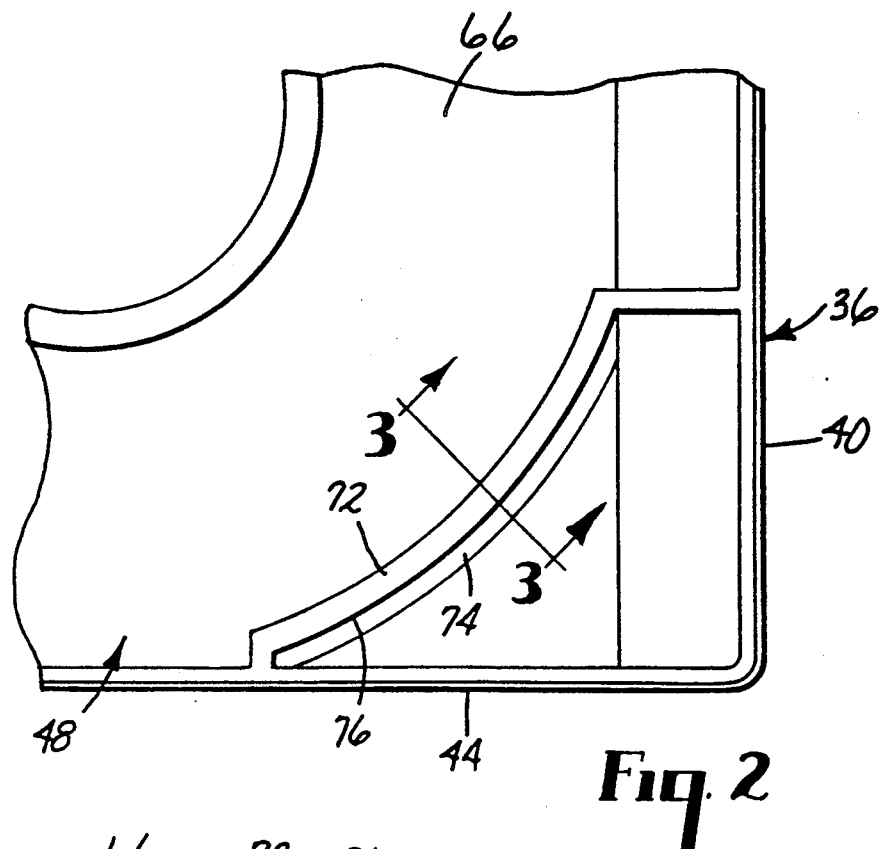
FIG. 2 is a top view of a base of the single reel tape cartridge of the present invention.

FIGS. 2 and 3 illustrate one strengthening rib 72. The portion of the lower wall 48 on one side of and adjacent the strengthening rib 72 has a groove 74 extending along at least part of the length of the strengthening rib 72, and preferably along substantially the entire length of the strengthening rib 72 as shown. For aesthetic purposes, the groove 74 is located on the side of the strengthening rib 72 closer to the adjacent corner of the base 36. As shown in FIG. 3, the groove 74 and the adjacent strengthening rib 72 share a common wall surface 76. The groove 74 extends into the lower wall 48 for at least 30% of the thickness of the lower wall 48 and preferably for up to 50% of the lower wall thickness. Additionally, the strengthening rib 72 in FIGS. 2 and 3 is thicker than the width of the groove 74 and the depth of the groove 74 is uniform and abruptly returns to the principal thickness of the lower wall 48. The groove 74 does not unduly weaken the lower wall 48.

Figure 5:
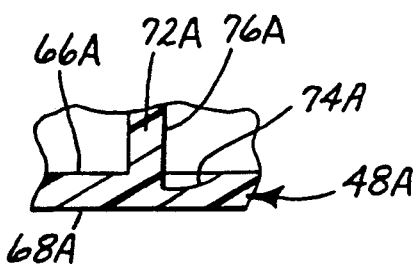
FIG. 5 is a cross-sectional view of a base according to an alternative embodiment of the present invention.
Figure 4:
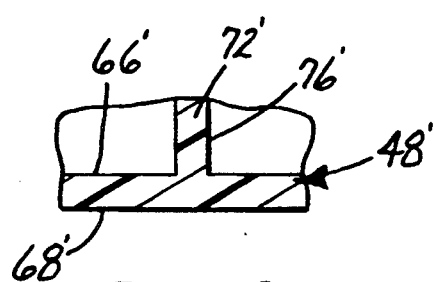
FIG. 4 is a cross-sectional view of a prior art cartridge base.

Alternatively, as shown in FIG. 5, the strengthening rib 72A can be thinner than or of equal thickness with the groove 74A. The depth of the groove 74A of FIG. 5 varies and gradually decreases in depth from the rib 72A until the thickness of the lower wall 48A returns to its principal thickness.

The groove 74 is created by a standing steel core which is an added structure of the mold which changes the geometry of the mold. The groove 74 reduces the mass of the plastic injected into the mold to form the base 36. This locally reduced mass enables the plastic to cool faster. Additionally, the standing steel core acts as a heat sink to further enhance cooling. The increased cooling reduces the visible sink in the finished base 36.

Additionally, by using the mold geometry to assist in the reduction of visible sink, the base 36 can be molded using a single gate rather than multiple gates as is commonly performed. Although using a single gate and forming bases with thinner walls than existing bases increases the pressure drop in the mold and can exacerbate sink, the groove 74 compensates for this, minimizes sink, and enables the use of a single-gated mold. Using a single gate increases productivity without wasting mold material as the single-gate advantages of lower mold complexity and a higher degree of molding process control can be realized without the penalty of severe visible sink. The groove allows the molding of parts with lower melt pressure transmittal than would normally yield acceptable results. Also, using lower pressures during the packing stage of the molding process reduces the molded-in stresses.

Similar grooves can be formed adjacent the strengthening ribs 72 on the cover 38 of the tape cartridge 10 although current covers are thinner than the bases and do not have serious sink problems. Additionally, in embodiments where the base is opaque and the cover is translucent, visible sink is not as much of a problem in the cover as in the base, as sink is not as visible in opaque parts.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A molded cartridge housing component for use in a single reel tape cartridge insertable into a tape drive apparatus, the cartridge housing component comprising:
- a rear wall;
- two opposing side walls;
- a front wall;
- a substantially rectangular major wall connecting the rear, front, and side walls, wherein the major wall has an inner surface and an outer surface;
- a strengthening rib formed on and extending from the inner surface of the major wall, wherein the strengthening rib divides the major wall into first and second portions and the thickness of the first portion is equal to the thickness of the second portion;
- wherein the inner surface of the second portion of the major wall has a groove extending along at least part of the length of the strengthening rib.

2. The cartridge housing component of claim 1 wherein the groove in the major wall extends along substantially the entire length of the strengthening rib.

3. The cartridge housing component of claim 1 wherein the groove in the major wall and the strengthening rib share a common wall surface substantially perpendicular to the inner surface of the major wall.

4. The cartridge housing component of claim 1 wherein the depth of the groove is at least 30% of the thickness of the major wall.

5. The cartridge housing component of claim 4 wherein the depth of the groove is constant.

6. The cartridge housing component of claim 4 wherein the depth of the groove varies.

7. The cartridge housing component of claim 1 wherein the strengthening rib has a thickness, the groove has a width, the rib thickness and groove width extend in the same direction, and the rib thickness is greater than the groove width.

8. The cartridge housing component of claim 1 wherein the strengthening rib has a thickness, the groove has a width, and the rib thickness and groove width extend in the same direction, and the groove width is at least as great as the rib thickness.

9. The cartridge housing component of claim 1 wherein the cartridge housing component comprises a base.

10. The cartridge housing component of claim 1 wherein the groove has two side walls, and the side wall farther form the strengthening rib forms an interior angle with the inner surface of the major wall less than 165°.

11. A single reel tape cartridge insertable into a tape drive apparatus comprising:
- a leader block;
- a length of tape connected at one end to the leader block;
- a tape reel on which the tape is wound;
- a molded base comprising a rear wall, two opposing side walls, a front wall, and a substantially rectangular major wall connecting the rear, front, and side walls, wherein the major wall has an inner surface and an outer surface; and
- a molded cover comprising a rear wall, two opposing side walls, a front wall, and a substantially rectangular major wall connecting the rear, front, and side walls, wherein the major wall has an inner surface and an outer surface;
- wherein at least one of the base and the cover comprises a strengthening rib formed on and extending from the inner surface of the major wall, wherein the strengthening rib divides the major wall into first and second portions and the thickness of the first portion is equal to the thickness of the second portion;
- wherein the inner surface of the second portion of the major wall has a groove extending along at least part of the length of the strengthening rib.

12. The cartridge of claim 11 wherein the groove in the major wall and the adjacent strengthening rib share a common wall surface.

13. The cartridge of claim 11 wherein the groove has two side walls, and the side wall farther from the strengthening rib forms an interior angle with the inner surface of the major wall less than 165°.

* * * * *

UNITED STATES PATENT AND TRADEMARK OFFICE
CERTIFICATE OF CORRECTION

PATENT NO. : 5,328,123
DATED : Jul. 12, 1994
INVENTOR(S) : LeNoue et al.

It is certified that error appears in the above-indentified patent and that said Letters Patent is hereby corrected as shown below:

Column 6, line 6, delete "form" and insert --from--

Signed and Sealed this

Fifteenth Day of November, 1994

Attest:

BRUCE LEHMAN

*Attesting Officer*  *Commissioner of Patents and Trademarks*